United States Patent [19]

Bruhm

[11] 3,901,379

[45] Aug. 26, 1975

[54] ANGULAR GUIDANCE FOR CONVEYOR BELT SYSTEMS

[75] Inventor: Dieter Bruhm, Harsum, Germany

[73] Assignee: Marryat Finance Limited, London, England

[22] Filed: May 23, 1974

[21] Appl. No.: 472,563

Related U.S. Application Data

[63] Continuation of Ser. No. 197,743, Nov. 11, 1971.

[30] Foreign Application Priority Data

Nov. 12, 1970 Germany.............................. 2055682

[52] U.S. Cl................................. 198/182; 198/202
[51] Int. Cl............................................ B65g 15/00
[58] Field of Search ............ 198/181, 182, 202, 184

[56] References Cited
UNITED STATES PATENTS

| | | | |
|---|---|---|---|
| 3,217,861 | 11/1965 | Daniluk et al......................... | 198/182 |
| 3,237,754 | 3/1966 | Freitag et al......................... | 198/182 |
| 3,327,839 | 6/1967 | Sigety et al. ........................ | 198/202 |
| 3,661,244 | 5/1972 | Koyama............................... | 198/184 |

FOREIGN PATENTS OR APPLICATIONS 942,301   11/1963   United Kingdom................. 198/181

*Primary Examiner*—Evon C. Blunk
*Assistant Examiner*—Joseph E. Valenza
*Attorney, Agent, or Firm*—Allison C. Collard

[57] ABSTRACT

The invention relates to angular guidance for conveyor belt systems, to the outer edge of which conveyor belt a longitudinal bead is attached which is guided between rollers. The axes of the rollers make an angle with one another in a manner that the bead is compressed to produce self-checking and a great amount of friction.

2 Claims, 8 Drawing Figures

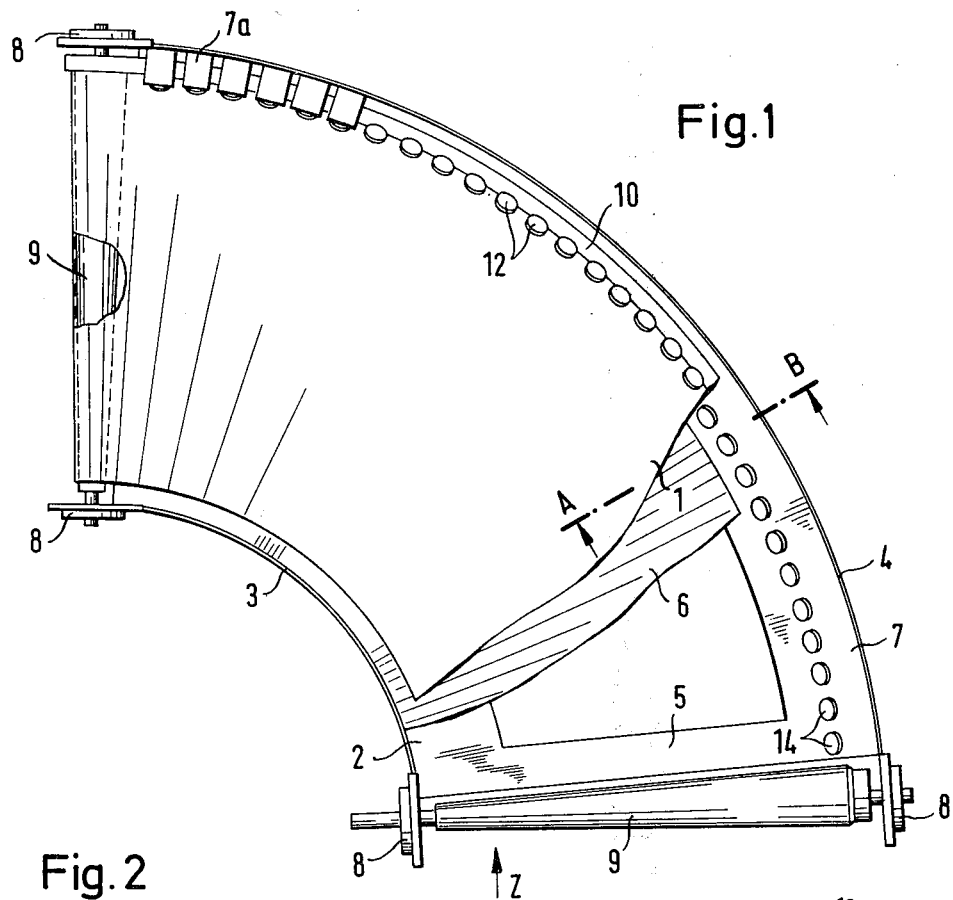
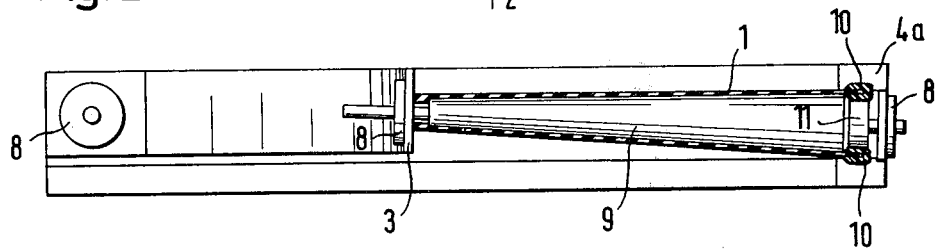
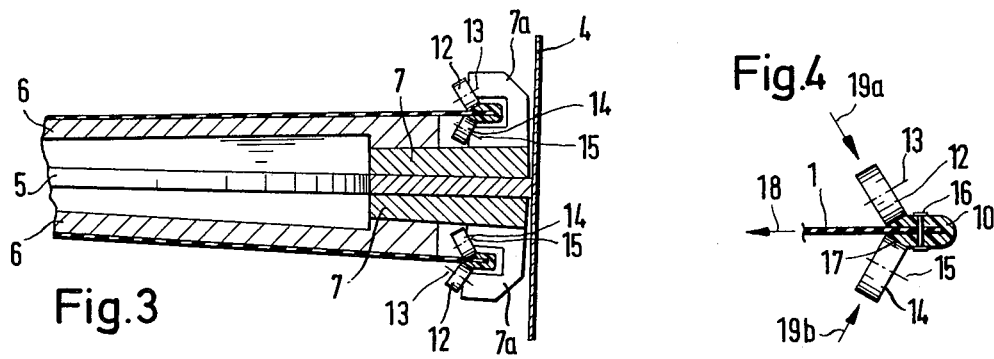

ANGULAR GUIDANCE FOR CONVEYOR BELT SYSTEMS

This is a continuation of application Ser. No. 197,743, filed Nov. 11, 1971.

DESCRIPTION

A type of belt conveyors of known construction have longitudinal beads on both longitudinal sides of the belt, which are guided between stationary rollers which are arranged above and below each rim end piece, the axes of which rollers are mounted in parallel to one another and run oblique to the conveyor belt. The longitudinal bead is provieded with oblique concavely vaulted lateral surfaces in which the convexly formed running surfaces of the rollers are guided. Convexly formed parallel rollers of this type and longitudinal beads having concavely vaulted side faces are, however, not suited for angular guidance of conveyor belt systems because the drawing forces of the conveyor belt working inward directedly will destroy in a short time the joint connecting the longitudinal bead. Thick beads, particularly made of rubber, are upset within and stretched outside by the smaller guide radii of the conic straight idlers so as to produce, in a short while, cracks and tears and other destructive effects. Indeed, however, an angular guidance for conveyor belts is known wherein the bottom side of the belt is provided with a V-belt vulcanized near the outer rim, which V-belt is supported laterally on an oblique guide roller. On the top side of the belt, a capstan idler or puck is associated with each guide roller, both of which are similarly mounted onto a spring-loaded carrier or support. An angular guidance system of this type is, however, of complex construction and susceptible to trouble.

An object of the invention resides in providing an angular guidance arrangement for conveyor belt systems of the type described above, which is of simple construction and highly reliable in service. This is achieved according to the invention by providing that axes of the rollers guiding the longitudinal bead enclose an angle between each other and are arranged symmetrically with respect to the conveyor belt. These rollers arranged obliquely on both sides of both end pieces of the belt securely hug with their running surfaces the side faces of the longitudinal bead. without the use of springs, thus providing for safe guidance of the external rim of the conveyor belt. On account of the oblique arrangement of the rollers, the forces tending to draw the conveyor belt towards the center act on the longitudinal bead in such a manner that the bead is compressed with such great force to produce self-checking and a great amount of friction. The joint between longitudinal bead and conveyor belt is not stressed or strained in this way. The conveyor belt is centered by the oblique rollers and the forces acting on both sides of the conveyor belt are of equal magnitude.

It is suitable to have the axes of the roller pairs diverge in a radial direction towards the outer rim of the conveyor belt, leading to an additional improvement of guidance. The roller axes are preferably slanted to the amount of 45° to 60° towards the plane of the conveyor belt such that the enclosed angle between the axes will range from about 90° to 120°.

According to an additional feature of the invention, the rollers are arranged in a portion of a curve type frame which portion encompasses the outer rim of the conveyor belt and spaced uniformely over its length.

Since the longitudinal bead guided and supported by the rollers is subject to strain, it is recommended to use as shoulder, a bordering or lining of the outer rim of the conveyor belt, which should have a u-type profile and preferably be made of wear-resistant synthetic material. A high degree of solidity is obtained when this bordering is fixedly connected to the conveyor belt by means of mechanical fixing elements, e.g. rivets or screws. In order to decrease the effect exerted on the rim bead by the strain of pulling action and in order to increase its durability said rim bead is suitably subdivided in lengthwise direction, while the individual parts of the bordering could be linked with each other.

These and other objects and advantages will be apparent from the claims and from the following detailed description when read in conjunction with the appended drawings showing several embodiments of the invention.

THE DRAWINGS

FIG. 1 is a top view of an embodiment of an angular guidance arrangement with a partially cut away conveyor belt without cover for the rollers;

FIG. 2 is a front view of FIG. 1 in the direction of arrow 2, wherein the rollers are located underneath a cover;

FIG. 3 is a cross section in part taken in the plane A—B of FIG. 1 at a larger scale and FIG. 4 is a detail of FIG. 3 at still a larger scale;

Figure 5:
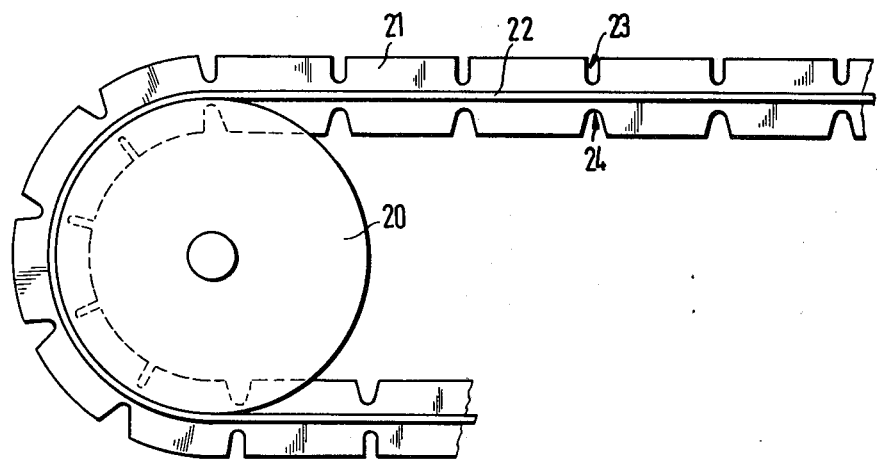
FIG. 5 is a side view of the angular guidance part of another embodiment of the conveyor belt.

The system according to FIG. 1 used for angularly guiding a conveyor belt 1, comprises a curve type frame or stand 2 in the form of circular section, which is capable of having any angle from 15° to 180°. The frame 2 is provided with an inner curved edge rail 3 and an outer curved edge rail 4 extending concentrically to the former. Both edge rails 3 and 4 are interconnected via several radial stays 5 carrying by way of an interconnecting frame part 7, a supporting plate 6 associated to each end of the conveyor belt 1. At each end of the curve-shaped frame 2, bearings 8 are mounted for each individual conical idler 9, extending radially to the curve and increasing in diameter in outward direction. The endless conveyor belt is led across both idlers 9, the upper end of which extends in a horizontal plane, such that the axes of both idlers are slanted correspondingly.

The outer rim of the conveyor belt 1 has a u-type profile and is surrounded by a wear-resistant synthetic material, e.g. of polyurethan such as Durolan, forming with the conveyor belt 1 an elastic shoulder 10 solidly attached by means of rivets 16. Both straight idlers 9 are provided at the extreme end of their greatest diameter with a cylindrical stud 11 (FIG. 2) corresponding to one width of the shoulder 10. By means of this stud the conveyor belt is protected against sliding off from the idlers 9. As shown in FIG. 4 the shoulder 10 is provided with oblique side faces 17 against which the cylindrical running surfaces of rollers 12 and 14 come to rest, which rollers are uniformly spaced over the entire length of the edge rail 4. The rollers 12 on the external sides of both sides of the belt are equipped with axes 13 while the rollers 14 mounted on the inner side are provided with axes 15. Both axes 13 and 15 are arranged in symmetrical relationship to one another to form a sharp angle with respect to the plane of the belt and diverge radially towards shoulder 10. The roller pairs 12 and 14 are housed in portion 7a of the curve guidance frame 7, which portion encompasses shoulder 10.

Figure 6:
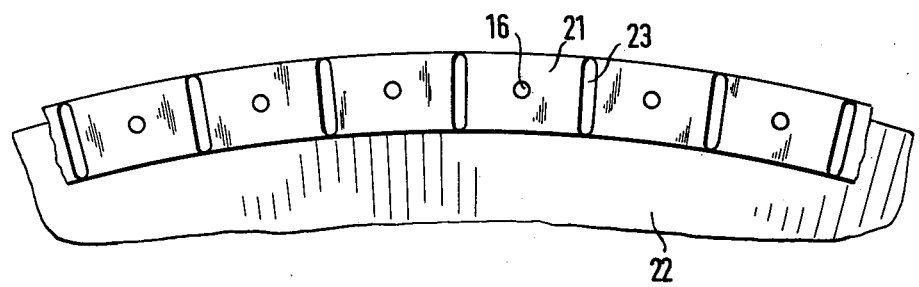
FIG. 6 is a top view of a detail shown in FIG. 5.

The embodiment according to FIGS. 5 and 6 shows the conveyor belt 22, guided about the conic idler 20, with an elastic shoulder 21 of u-shaped profile provided on the external side of the belt with straight slots 23 and on the internal side with wedge-shaped slots 24, such that the conveyor belt can be easily bent when wound around the straight idler 20. The shoulder is riveted in the same manner as above to the conveyor belt.

Figure 7:
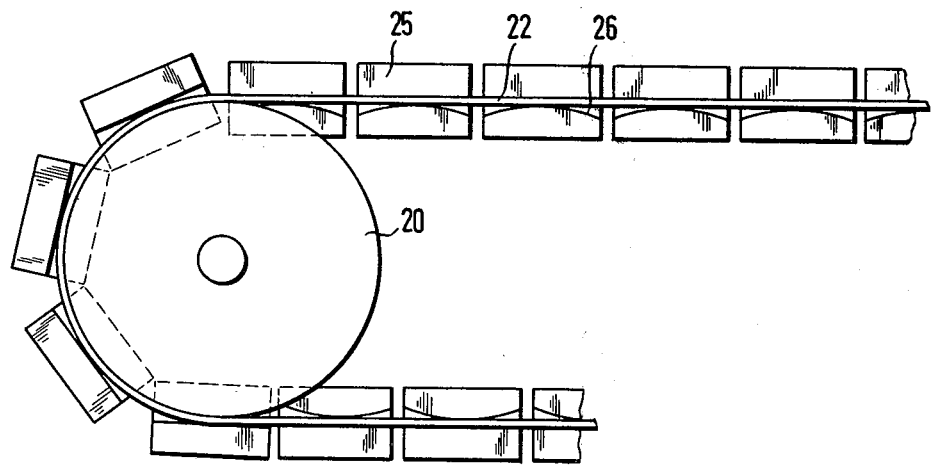
FIG. 7 is a side view of the guidance of yet another embodiment.
Figure 8:
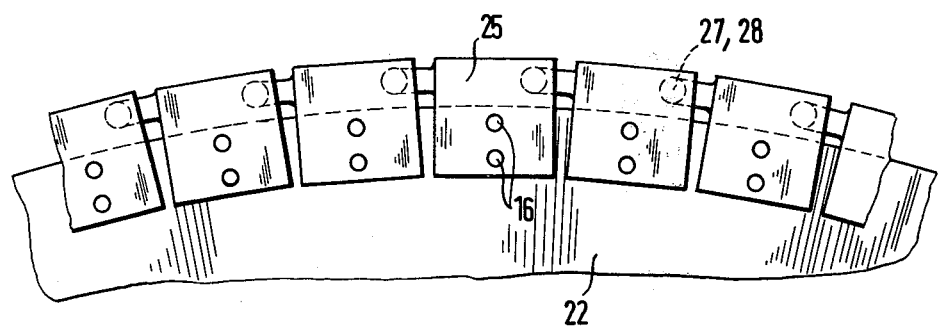
FIG. 8 is a top view of a detail shown in FIG. 7.

The shoulder according to FIGS. 7 and 8 comprises separate rigid blocks 25 attached by means of rivets 16 to the conveyor belt 22 led about the conic idler 20. These blocks are arranged in spaced relationship to one another, such that they do not impede the winding of the conveyor belt around even small idlers. For this reason, they are provided on the inner side of the conveyor belt 22 with a convexlyformed hugging surface 26 for the conveyor belt 22. The individual blocks 25, compare in particular FIG. 8, are provided on one side thereof with an adjoining piece 27 which engages in an articulated manner with its rounded end the corresponding recess 28 of the neighbouring block, thus interlinking all blocks 25 over the entire length of the conveyor belt.

The mode of operation of the embodiments described above becomes apparent by way of FIG. 4. Due to the oblique arrangement of rollers 12 and 14 the forces, tending to draw the conveyor belts 1 and 22, respectively, in the direction of arrow 18 towards the center of the curve-shaped frame 2, act on the shoulders 10 and 21, respectively, or on the row of blocks 25 in such a way as to compress them with great force. This gives rise to a great frictional force and produces a self-locking action, preventing the joint between the soulders 10 and 21 and blocks 25, respectively, and the conveyor belt to be subjected to strain. Furthermore, the conveyor belt is centered by the oblique rollers 12 and 14 and forces 19a and 19b are applied on both sides with the same magnitude. Consequently the angular guidance according to the invention assures a high degree of performance reliability and is of great durability.

What is claimed is:

1. An annular guidance apparatus for a conveyor belt supported on a conveyor belt frame wherein the belt runs in a plane defined by the direction of conveyance and including a plurality of conically-shaped idler rollers for leading a conveyor belt around an angular bend of the conveyor belt frame between the idle rollers comprising:

a longitudinally extending flexible shoulder member attached to the outer edge of the conveyor belt said shoulder member comprising a plurality of blocks having at least two inner abutment faces disposed on the inner side of said blocks and arranged in a row and evenly spaced over the length of the conveyor belt, said blocks each having an outwardly extending stud member, and a recess for receiving a stud member, each of the recesses of said blocks receiving the stud member of an adjacent block for linking the blocks in series with each other, a plurality of guide rollers mounted on the conveyor belt frame and disposed symmetrically about the conveyor belt at an angle to each other with the axis thereof diverging radially outwardly towards the outer edge of the conveyor belt, said guide rollers engaging the inner abutment faces of said blocks and compressing said blocks between the idler rollers as the conveyor belt is led around an angular bend of the conveyor belt frame.

2. The angular guidance apparatus as recited in claim 1 wherein each of said blocks includes a convex bearing surface disposed in one side thereof, and disposed on the inner side of the conveyor belt for engaging the idler rollers of the conveyor belt system.

* * * * *